(12) United States Patent
Naruse et al.

(10) Patent No.: US 9,812,916 B2
(45) Date of Patent: Nov. 7, 2017

(54) MOTOR BOBBIN (71) Applicant: DUPONT TEIJIN ADVANCED PAPERS (JAPAN), LTD., Tokyo (JP)

(72) Inventors: Shinji Naruse, Tokyo (JP); Tatsushi Fujimori, Tokyo (JP); Chihiro Kondo, Tokyo (JP); Yasunori Tanaka, Tokyo (JP)

(73) Assignee: DUPONT TEIJIN ADVANCED PAPERS (JAPAN), LTD., Tokyo (JP)

( * ) Notice: Subject to any disclaimer, the term of this patent is extended or adjusted under 35 U.S.C. 154(b) by 182 days.

(21) Appl. No.: 14/437,078

(22) PCT Filed: Dec. 19, 2013

(86) PCT No.: PCT/JP2013/084123
§ 371 (c)(1),
(2) Date: Apr. 20, 2015

(87) PCT Pub. No.: WO2014/115452
PCT Pub. Date: Jul. 31, 2014

(65) Prior Publication Data
US 2015/0288238 A1 Oct. 8, 2015

(30) Foreign Application Priority Data
Jan. 24, 2013 (JP) .................................. 2013-011012

(51) Int. Cl.
*H02K 3/30* (2006.01)
*H02K 3/46* (2006.01)
(Continued)

(52) U.S. Cl.
CPC .............. *H02K 3/345* (2013.01); *B33Y 80/00* (2014.12); *H02K 3/30* (2013.01); *H02K 3/52* (2013.01);
(Continued)

(58) Field of Classification Search
CPC ...... H02K 15/022; H02K 15/10; H02K 3/325; H02K 3/345; H02K 3/46; H02K 3/30;
(Continued)

(56) References Cited

U.S. PATENT DOCUMENTS

| 8,661,651 B2 | 3/2014 | Tsuiki et al. |
| 2006/0068670 A1* | 3/2006 | Anderson ............... B32B 5/022 442/391 |

(Continued)

FOREIGN PATENT DOCUMENTS

| CN | 102460906 | 5/2012 |
| CN | 102780287 | 11/2012 |

(Continued)

OTHER PUBLICATIONS

Extended European Search Report dated Sep. 7, 2016 in European patent application No. 13 87 2732.

(Continued)

*Primary Examiner* — Tran Nguyen
(74) *Attorney, Agent, or Firm* — Wenderoth, Lind & Ponack, L.L.P.

(57) ABSTRACT

Provided is a motor bobbin around which a winding wire is wound, said motor bobbin comprising insulating paper and a resin molded body. The insulating paper and the resin molded body are coupled and fixed together without using an adhesive agent. Surfaces of the insulating paper which are in contact with the resin molded body are configured using aramid paper comprising an aramid fibrid and aramid short fibers. Resin is melt extruded and thermal-fusion bonded upon the aramid paper comprising the aramid fibrid and the aramid short fibers, and the surfaces configured from the aramid paper are surface treated to obtain the insulating (Continued)

paper. The motor bobbin is obtained by bringing melted portions of the resin molded body into contact with the top of the aramid paper.

8 Claims, 2 Drawing Sheets

(51) Int. Cl.
- *H02K 3/34* (2006.01)
- *H02K 3/52* (2006.01)
- *B33Y 80/00* (2015.01)
- *B29C 70/68* (2006.01)
- *B29L 31/34* (2006.01)

(52) U.S. Cl.
CPC .............. *H02K 3/522* (2013.01); *B29C 70/68* (2013.01); *B29K 2277/10* (2013.01); *B29K 2995/0007* (2013.01); *B29L 2031/3406* (2013.01); *H02K 2203/12* (2013.01)

(58) Field of Classification Search
CPC ........ H01F 5/02; H01F 41/125; H01F 27/325; B29C 45/14639; B29C 45/14; B32B 5/26; B32B 27/08; B32B 27/12; B32B 27/28
USPC .................................................. 310/194, 215
See application file for complete search history.

(56) References Cited

U.S. PATENT DOCUMENTS

| | | | | |
|---|---|---|---|---|
| 2012/0128988 A1* | 5/2012 | Yokura | ..................... | B32B 5/26 428/419 |
| 2012/0286619 A1 | 11/2012 | Tsuiki et al. | | |

FOREIGN PATENT DOCUMENTS

| | | | |
|---|---|---|---|
| JP | 2002-142399 | | 5/2002 |
| JP | 2005-102454 | | 4/2005 |
| JP | 2009-130942 | | 6/2009 |
| JP | 2009278839 A | * | 11/2009 |
| JP | 2011234537 A | * | 11/2011 |
| JP | 2012-29379 | | 2/2012 |
| JP | 2012-44780 | | 3/2012 |
| JP | 2012-180619 | | 9/2012 |
| TW | 201218580 | | 5/2012 |

OTHER PUBLICATIONS

International Search Report dated Apr. 1, 2014 in International Application No. PCT/JP2013/084123.

* cited by examiner

MOTOR BOBBIN

TECHNICAL FIELD

The present invention relates to a motor bobbin, and more specifically to a motor bobbin to be fitted to a core member such as a magnetic core coil in a state where a coil is wound around the motor bobbin in, for example, a motor stator constituting a motor generator of a hybrid vehicle, an electric automobile, etc., or the like.

BACKGROUND ART

A motor generator functioning selectively as an electric motor and a power generator is mounted on a hybrid vehicle or an electric automobile. Such a motor generator includes, for example, a cylindrical rotor fixed to an output shaft supported rotatably around an axis, a motor stator having an inner peripheral surface away from an outer peripheral surface of the rotor with a predetermined space provided therebetween, and a motor housing accommodating the motor stator. A motor stator constituting such a motor generator generally includes a core member and a coil. To insulate the core member and the coil from each other, a coil is wound around a motor bobbin, and the bobbin around which the coil is wound is fitted to the core member. Conventionally, such a motor bobbin is made of a synthetic resin, in general, and polyphenylene sulfide or the like is used as the synthetic resin, for example, in a case of a concentrated winding stator (see, for example, Japanese Patent Application Publication Nos. 2005-102454 and 2002-142399).

However, when the bobbin is made of such a synthetic resin, the lower limit of the thickness of the bobbin is said to be about 0.6 mm, and the recent further increase in efficiency, increase in power output, and reduction in size of motor generators and the like are not necessarily sufficiently coped with. It is said that a bobbin for a motor generator required to have a high efficiency and a large output has to fulfill the following four characteristics simultaneously:
1) being thin (small thickness);
2) preventing ground fault between a coil and a core member (high withstand voltage, partial discharge resistance);
3) withstanding heat generated by the coil (heat resistance); and
4) having mechanical strength.

In particular, the small thickness is considered to be extremely important in the sense that the thinner the bobbin is, the more the coil can be increased, so that the space factor can be increased, and the increase in power output can be achieved.

SUMMARY OF INVENTION

An object of the present invention is to provide a motor bobbin capable of coping with an increased efficiency and an increased power output of a motor generator or the like.

In view of such a circumstance, the present inventors have conducted intensive study to develop a motor bobbin capable of coping with an increased efficiency and an increased power output of a motor generator or the like, and consequently have accomplished the present invention.

In a first aspect, the present invention provides a motor bobbin around which a coil is to be wound, the motor bobbin comprising:

an insulating paper; and
a molded resin article, wherein
the insulating paper and the molded resin article are connected and fixed to each other without using an adhesive agent,
a surface of the insulating paper in contact with the molded resin article comprises an aramid paper comprising an aramid fibrid and an aramid short fiber,
the insulating paper is obtained by melt-extruding and thermally melt-bonding a resin onto the aramid paper comprising the aramid fibrid and the aramid short fiber and subjecting the surface comprising the aramid paper to a surface treatment, and
the motor bobbin is obtained by bringing an molten portion of the molded resin article into contact with the aramid paper.

In a second aspect, the present invention provides the motor bobbin according to the first aspect, comprising a bobbin body at least partially made of the insulating paper.

In a third aspect, the present invention provides the motor bobbin according to the first aspect, comprising a pair of the molded resin articles connected to both ends of the bobbin body.

In a fourth aspect, the present invention provides the motor bobbin according to the first aspect, wherein the surface treatment is a plasma surface treatment.

In a fifth aspect, the present invention provides the motor bobbin according to the first aspect, wherein the surface of the insulating paper in contact with the molded resin article is impregnated with the molded resin article.

In a sixth aspect, the present invention provides the motor bobbin according to the first aspect, wherein the molded resin article has a groove for positioning a coil.

In a seventh aspect, the present invention provides a method for producing the motor bobbin according to the first aspect, the method comprising bonding the molded resin article and the insulating paper to each other simultaneously with molding of the molded resin article.

In an eighth aspect, the present invention provides a motor comprising a stator obtained by winding a coil around the motor bobbin according to any one of the first to sixth aspects with which a core member is integrated.

In a ninth aspect, the present invention provides a motor generator comprising a stator obtained by winding a coil around the motor bobbin according to any one of the first to sixth aspects with which a core member is integrated.

In a tenth aspect, the present invention provides a power generator comprising a stator obtained by winding a coil around the motor bobbin according to any one of the first to sixth aspects with which a core member is integrated.

DESCRIPTION OF EMBODIMENTS

Figure 1:
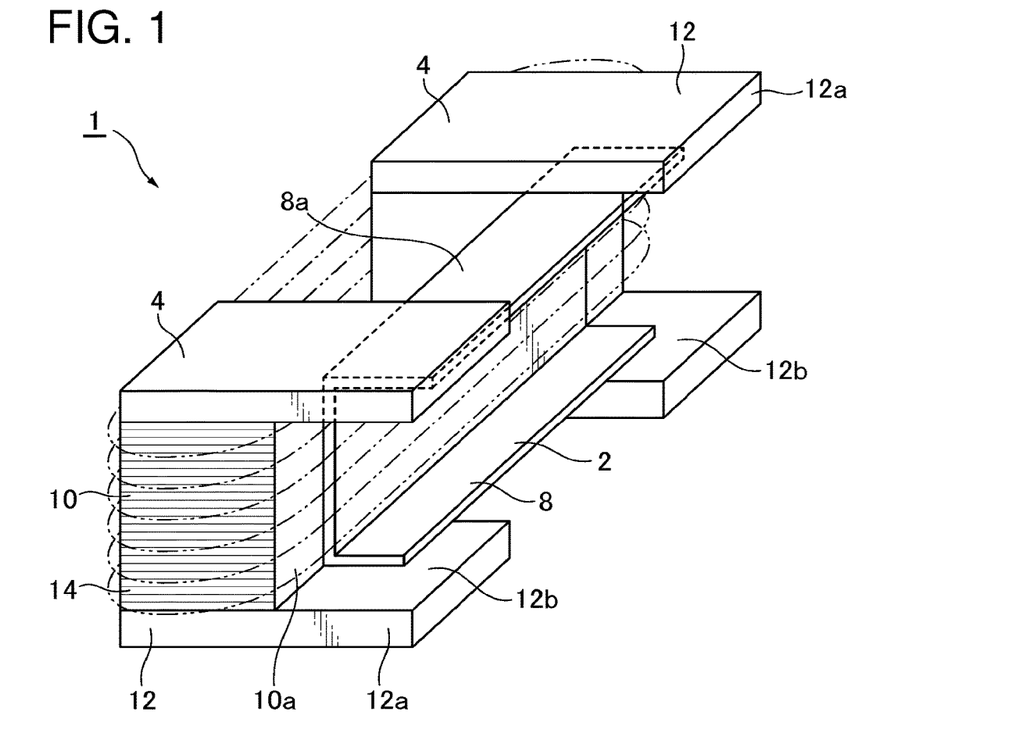
FIG. 1 is a perspective view of a motor bobbin of an embodiment of the present invention.

Hereinafter, a motor bobbin of a preferred embodiment of the present invention will be described in detail with reference to the drawings. However, the present invention is not particularly limited to this embodiment. FIG. 1 is a perspective view of a motor bobbin 1 of the preferred embodiment of the present invention.

The motor bobbin 1 comprises a bobbin body 2 having a U-shaped cross section and a pair of molded resin articles 4 attached to both ends of the bobbin body 2.

Figure 2:
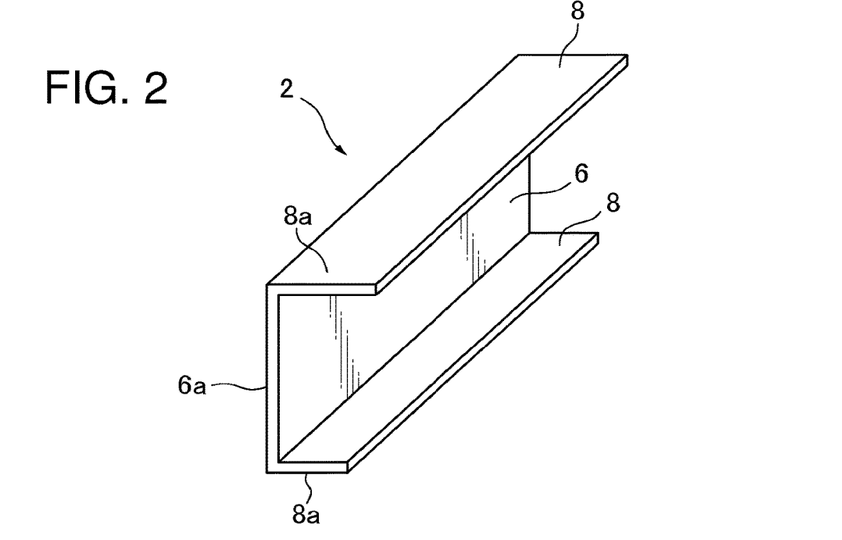
FIG. 2 is a perspective view of a bent insulating paper constituting the motor bobbin of FIG. 1.

As shown in FIG. 2 which is a perspective view of the bobbin body 2, the bobbin body 2 is formed to have the U-shaped cross section by bending edge portions on both sides of a rectangular insulating paper at a substantially right angle in the same direction, and includes a center portion 6 and a pair of bent portions 8, 8 at edges on both sides.

Figure 3:
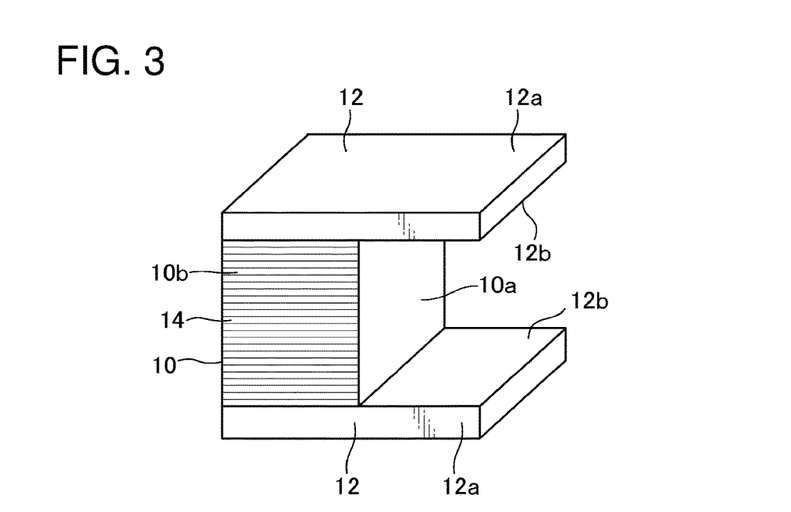
FIG. 3 is a perspective view of a molded resin article constituting the motor bobbin of FIG. 1.

As shown in FIG. 3 which is a perspective view of a molded resin article 4, the molded resin article 4 includes a cuboid main body portion 10 and a pair of eave portions 12, 12 provided at both ends of the main body portion 10. In the motor bobbin 1 of this embodiment, the main body portion 10 and the pair of eave portions 12, 12 are formed integrally with each other. The eave portions 12 have the same shape, and a tip side portion of each eave portion 12 is formed into an extending portion 12a extending from the main body portion 10. Consequently, the molded resin article 4 has a substantially U-shaped cross-section. In addition, in the molded resin article 4, a space having a rectangular cross section and being surrounded in three directions by inner surfaces 12b of the extending portions 12a of the eave portions 12 and a side surface 10a of the main body portion 10 in an extending direction of the extending portion 12a. The distance between the inner surfaces 12b of the extending portions 12a of the pair of eave portions 12 is substantially equal to a width of the center portion 6 of the bobbin body 2.

Each of the both ends of the bobbin body 2 in the longitudinal direction is connected to the corresponding one of the molded resin articles 4. Specifically, the bobbin body 2 having the U-shaped cross section is connected and fixed to the molded resin articles 4 at each of the two ends of the bobbin body 2 in such a manner that an outer surface 6a of the center portion 6 is joined to the side surface 10a of the main body portion 10 of the molded resin article 4, and outer surfaces 8a of each of the bent portions 8 are joined to the inner surfaces 12b of the extending portions 12a of the molded resin article 4.

The bobbin body 2 is connected to each molded resin article 4 at a joint portion with the molded resin article 4 without using an adhesive agent. Moreover, a surface of the bobbin body 2 joined to the molded resin article 4 comprises an aramid paper comprising an aramid fibrid and an aramid short fiber. Moreover, an insulating paper is obtained by melt-extruding and thermally melt-bonding a resin onto the aramid paper comprising the aramid fibrid and the aramid short fiber and subjecting the surface comprising the aramid paper to a surface treatment.

In the motor bobbin 1 of this embodiment, many horizontally extending grooves 14 for positioning a coil are formed all over a side surface 10b, which faces outward, of the main body portion 10 of each molded resin article 4.

Figure 4:
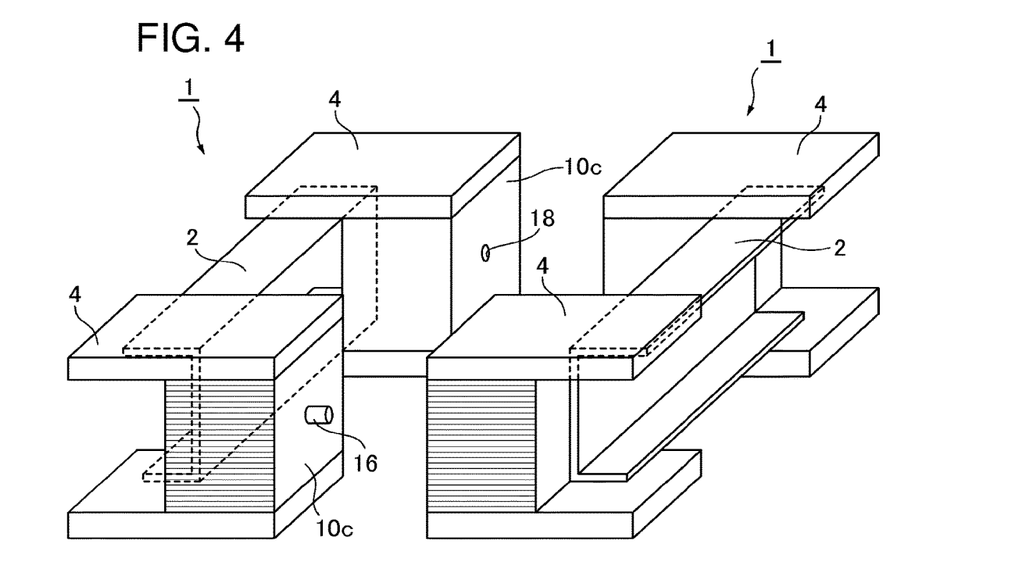
FIG. 4 is a perspective view showing an arrangement of the motor bobbin of FIG. 1 in a case where the motor bobbin is combined with a stator core.

As shown in FIG. 4, in the motor bobbin 1 of this embodiment, a protrusion 16 is formed on a back side 10c of the main body portion 10 of one of the molded resin articles 4, and a recessed portion 18 is formed on a back side 10c of the main body portion 10 of the other one of the molded resin articles 4. The protrusion 16 and the recessed portion 18 are used when a pair of the motor bobbins 1 are arranged away from each other in the arrangement as shown in FIG. 4, and connected to a stator core arranged between the pair of the motor bobbins 1.

(Aramid)

In the present invention, an aramid means a linear polymeric compound (aromatic polyamide) in which 60% or more of amide linkages are directly bonded to aromatic rings. Examples of such an aramid include poly(meta-phenylene isophthalamide), copolymers thereof, poly(para-phenylene terephthalamide), copolymers thereof, poly(para-phenylene)-copoly(3,4'-diphenyl ether)terephthalamide, and the like. These aramids are industrially produced by, for example, a conventionally known interfacial polymerization method, a solution polymerization method, or the like using an isophthalic chloride and m-phenylenediamine, and are available as commercial products. However, the aramids are not limited thereto. Of these aramids, poly(meta-phenylene isophthalamide) is preferably used, because it has excellent characteristics such as formability, thermal bonding characteristics, flame retardancy, and heat resistance.

(Aramid Fibrid)

In the present invention, an aramid fibrid is film-like aramid particle having a property of being formed into paper, and is also referred to as an aramid pulp (see Japanese Examined Patent Application Publications Nos. Sho 35-11851 and Sho 37-5732, etc.).

It is well known that an aramid fibrid is used as a paper-making raw material after being subjected to disintegration treatment and beating/refining treatment, as in the case of ordinary wood pulp. To keep the quality suitable for paper making, a so-called beating/refining treatment can be conducted on the aramid fibrid. This beating/refining treatment can be conducted by using a disk refiner, a beater, or other paper-making raw material processing apparatuses exerting a mechanical cutting effect. In this operation, the morphological change of the fibrid can be monitored by the drainability (freeness) testing method specified in Japanese Industrial Standard P 8121. In the present invention, the freeness of the aramid fibrid subjected to the beating/refining treatment is preferably in a range from 10 $cm^3$ to 300 $cm^3$ (Canadian freeness (JIS P 8121)). A fibrid having a freeness above this range may lead to decrease in strength of an aramid paper formed from the fibrid. On the other hand, when an attempt is made to obtain a freeness below 10 $cm^3$, the efficiency of utilization of the inputted mechanical power is lowered, and the amount of processing per unit time decreases in many cases. Moreover, the fibrid becomes excessively fine, so that the so-called binder function tends to decrease. Hence, no significant advantage is seen by obtaining a freeness smaller than 10 $cm^3$, as described above.

(Aramid Short Fiber)

The aramid short fiber is one obtained by cutting a fiber made of an aramid. Examples of such a fiber include those available under the trade names of "TEIJIN CONEX (registered trademark)" of Teijin Limited, "NOMEX (registered trademark)" of DuPont, and the like, but are not limited thereto.

The length of the aramid short fiber can be selected in a range generally from 1 mm inclusive to 50 mm exclusive, and preferably from 2 to 10 mm. If the length of the short fiber is less than 1 mm, mechanical characteristics of a sheet material deteriorate. On the other hand, a short fiber having a length of 50 mm or more tends to undergo "entanglement," "bundling," and the like during production of an aramid paper by a wet method, and hence tends to cause defects.

(Aramid Paper)

In the present invention, the aramid paper is a sheet-like article mainly constituted of the above-described aramid fibrid and aramid short fiber, and has a thickness in a range from 20 μm to 1000 μm, in general. In addition, the aramid paper has a basis weight in a range from 10 g/m² to 1000 g/m², in general. Here, the aramid fibrid and the aramid short fiber can be mixed at any ratio. The aramid fibrid/aramid short fiber ratio (mass ratio) is preferably 1/9 to 9/1, and more preferably 2/8 to 8/2, but is not limited to this range.

In general, the aramid paper is produced by a method in which the above-described aramid fibrid and aramid short fiber are mixed with each other and then a sheet is formed therefrom. Specific examples of employable methods include a method in which the aramid fibrid and the aramid short fiber are dry blended with each other, and then a sheet is formed by using air stream, a method in which the aramid fibrid and the aramid short fiber are dispersed in a liquid medium and mixed with each other, then a sheet is formed by discharging the dispersion onto a liquid permeable support such as a wire or a belt, and the liquid is removed from the sheet, which is then dried, and the like. Of these methods, the so-called wet paper making method is preferably selected in which water is used as the medium.

In the wet paper making method, aqueous slurries containing at least the aramid fibrid and the aramid short fiber or an aqueous slurry containing a mixture thereof is fed to a paper machine and dispersed, followed by water-draining, water-squeezing, and drying operations, and then the paper is wound as a sheet, in general. As the paper machine, a Fourdrinier paper machine, a cylinder paper machine, an inclined-type paper machine, a combination paper machine in which any ones of these paper machines are combined, or the like is used. In the case of production using a combination paper machine, it is possible to obtain a composite sheet comprising multiple paper layers by forming sheets from slurries having different mixing ratios and integrating these sheets together. If necessary, additives such as a dispersibility improver, a defoamer, and a strengthening agent are used in the papermaking.

The density and mechanical strength of the aramid paper obtained as described above can be improved by hot-pressing the aramid paper between a pair of rolls at high temperature and high pressure. When metal rolls are used, the hot-pressing conditions are, for example, that the temperature is in a range from 100 to 400° C. and the linear pressure is in a range from 50 to 400 kg/cm, but are not limited thereto. It is also possible to laminate multiple aramid papers during the hot-pressing. The above-described hot-pressing can be conducted multiple times in any order.

(Insulating Paper)

In the insulating paper of the present invention, at least the surface of the insulating paper on the side bonded to the molded resin article comprises the aramid paper comprising the aramid fibrid and the aramid short fiber. An insulating paper obtained by performing a surface treatment on an insulating paper which has been obtained by melt-extruding and thermally melt-bonding a resin onto an aramid paper falls within the insulating paper of the present invention. As the resin, a polymer such as polyethylene terephthalate, polyethylene naphthalate, polyimide, polytetrafluoroethylene, polyphenylene sulfide, polyamide, semi-aromatic polyamide, or phenoxy, a blend or alloy of any ones of these polymers, or the like is preferably used. However, the resin is not limited thereto.

The numbers of the aramid paper layers and the resin layers laminated can be selected, as appropriate, depending on the application and purpose of the laminate. At least one surface layer is preferably an aramid paper layer, because the excellent slippability achieved by the aramid paper layer brings about an effect of allowing the bobbin as described above to be easily inserted, for example, between a core member of a motor stator and a coil, i.e., in a slot provided to the core member, in a motor. For example, as described in Japanese Patent Application Publication No. 2006-321183, the laminate may be a laminated sheet including two layers of a polymer and an aramid paper, the polymer being made of an aromatic polyamide resin and an epoxy group-containing phenoxy resin having an epoxy group(s) in its molecule and having a ratio of the epoxy group-containing phenoxy resin of 30 to 50% by mass, or may be a laminated sheet including three layers of an aramid paper, the polymer, and an aramid paper. However, the number of the layers is not limited thereto.

The thickness of the laminate can be selected, as appropriate, depending on the application and purpose of the laminate, and any thickness can be selected unless the thickness causes any trouble in processability during bending, winding, and the like. In general, from the viewpoint of the processability, the thickness is preferably in a range from 50 μm to 1000 μm, but is not limited thereto.

(Surface Treatment)

The surface treatment in the present invention may be a plasma surface treatment, a corona surface treatment, a liquid immersion surface treatment, or the like. By conducting such a surface treatment, the surface energy of the surface of the insulating paper is improved, and the interfacial energy with molded resin article is lowered, so that the bonding quality of the insulating paper to the molded resin article is improved. A plasma surface treatment is particularly preferable because the treatment is easy to perform.

(Plasma Surface Treatment)

The plasma surface treatment in the present invention refers to a treatment which is conducted by exposing a workpiece to an electric discharge started and continued by applying a direct or alternating high voltage between electrodes, such as corona discharge under atmospheric pressure or glow discharge under a vacuum. Here, a treatment under a vacuum is preferable, because a wide variety of treatment gases can be selected, although the treatment is not particularly limited thereto. The treatment gas is not particularly limited, and one of or a mixture of He, Ne, Ar, nitrogen, oxygen, carbon dioxide gas, air, steam, and the like is used as the treatment gas. Of these gases, Ar and carbon dioxide gas are preferable in terms of discharge-starting efficiency. The treating pressure is not particularly limited, and a glow discharge treatment in which the electric discharge is conducted continuously in a pressure range from 0.1 Pa to 1330 Pa, i.e., the so-called low-temperature plasma treatment is preferable in terms of treatment efficiency. The treating pressure is further preferably in a range from 1 Pa to 266 Pa.

More specifically, desired excellent thermal melt-bonding characteristics can be obtained in the present invention, when the composition ratio X (O/C) of oxygen atoms (O) to carbon atoms (C) on the surface of the aramid paper is in a range from 120% to 250%, both inclusive, of the theoretical value. Here, the composition ratio X (O/C) refers to the ratio between the number of carbon atoms (C) and the number of oxygen atoms (O) (measured values) obtained by measuring the surface of the aramid paper by XPS (X-ray photoelectron spectroscopy). In addition, the theoretical value of the composition ratio refers to a value of the ratio of the numbers of atoms calculated on the basis of the repeating unit in the chemical structural formula of the polymer in the resin composition constituting the resin.

For example, in the case of NOMEX (registered trademark) paper, the ratio C/O/N equals to 14/2/2 in poly(meta-phenylene isophthalamide), which is the main component.

The theoretical value of the composition ratio X (O/C) of the number of carbon atoms (C) and the number of oxygen atoms (O), which is determined on the basis of the carbon (C), is 2/14=0.143. In general, since a trace amount hydrocarbons are attached to the surface, an actually measured value is said to be smaller than the theoretical value. Excellent thermal melt-bonding characteristics were successfully obtained, when the composition ratio X (O/C) was in the range from 120% to 250%, both inclusive, of the theoretical value, i.e., when the composition ratio X (O/C) was larger than the theoretical value by a range from 20% to 150%. The composition ratio X (O/C) is more preferably in a range from 150% to 230%, both inclusive. If the composition ratio X is less than 120% of the theoretical value, excellent thermal melt-bonding characteristics cannot be obtained. Meanwhile, if the composition ratio X (O/C) exceeds 250% of the theoretical value, excellent thermal melt-bonding characteristics cannot be obtained, either.

In addition, as a method for obtaining an aramid paper having a composition ratio X (O/C) within the above-described range, a method may be employed in which a low-temperature plasma treatment is conducted on the surface of an aramid paper obtained by the above-described method by using a low-temperature plasma treatment apparatus. Thus, an aramid paper excellent in thermal melt-bonding characteristics can be obtained.

Here, when the low-temperature plasma treatment is conducted on the aramid paper by employing an inner electrode type plasma treatment apparatus, the treatment intensity (output) of the low-temperature plasma treatment is preferably in a range from 30 W·min/m$^2$ to 1500 W·min/m$^2$. Thus, the above-described composition ratio X (O/C) of the surface of the aramid paper can be obtained within the above-described range. If the intensity of the low-temperature plasma treatment is below the above-describe range, the above-described composition ratio X is small. Meanwhile, if the intensity of the low-temperature plasma treatment is above the above-describe range, the above-described composition ratio X is large. In either case, excellent thermal melt-bonding characteristics cannot be obtained. More preferably, the treatment intensity (output) is in a rage from 130 W·min/m$^2$ to 1200 W·min/m$^2$.

(Molded Resin Article)

In the present invention, the molded resin article refers to a molded article fabricated by a melt injection molding method in which, for example, a PPS resin (polyphenylene sulfide resin), an acrylonitrile.butadiene.styrene copolymer resin, a polyimide-based resin, a polyethylene terephthalate-based resin, a poly acetal-based resin, a polymer having amide linkages such as polyamide 6, polyamide 66, polyamide 612, polyamide 11, polyamide 12, copolymerized polyamide, amide MXD6, polyamide 46, methoxymethylated polyamide, or semi-aromatic polyamide, a polymer containing a polyamide resin composition as shown in Japanese Patent Application Publication No. 2006-321951, a mixture thereof, or a mixture of any of these polymers and an inorganic material such as glass fiber in a molten state is injected into a desired mold, and detached from the mold after cooling. A molded article of a mixture of a semi-aromatic polyamide and glass fiber is particularly preferable because of the high heat resistance. Examples of the mixture include Zytel (registered trademark) HTN 51G and 52G of DuPont, and the like, but are not limited thereto.

It is preferable to form grooves for positioning a coil in a portion of the molded resin article to be in contact with the coil, because this stabilizes the position of the coil, and enables regular winding of the coil with high precision, which brings about an effect of improving the efficiency of a motor generator or the like.

(Method for Producing Motor Bobbin)

In the above-described mold, an insulating paper subjected to the plasma surface treatment in advance is disposed with at least a plasma surface-treated portion partially being in contact with a molten portion of the molded resin article. Thus, at least the plasma surface-treated surface portion of the insulating paper can be impregnated with the molten polymer. The fabrication of the motor bobbin in which the portion of the molded resin article and the insulating paper are connected and fixed to each other as described above makes it possible to conduct the connection and fixation simultaneously with the fabrication of the molded resin article, while eliminating the need for the use of an adhesive agent. In addition, the use of the aramid paper in the body portion enables the body portion to be thin, and makes it possible to improve the space factor and the thermal conductivity. A stator for a motor is obtained by integrating a core member with the motor bobbin of the present invention, and winding a coil around the motor bobbin of the present invention. This stator can be used for a motor generator, a power generator, or the like.

Hereinafter, the present invention is described based on Examples. Note that these Examples are presented for illustrating contents of the present invention by way of examples, and the contents of the present invention are not limited to those Examples at all.

EXAMPLES (Measurement Methods)
(1) Measurement of Basis Weight and Thickness
These were measured in accordance with JIS C 2300-2.
(2) Calculation of Density
The density was calculated by dividing the basis weight by the thickness.
(3) Bonding Quality
The bonding portion between the insulating paper and the molded resin article was visually observed.
(4) Appearance of Insulating Paper Portion
The degree of warp of the insulating paper portion due to heat during the molding was visually determined.

Reference Example (Preparation of Raw Materials)

A fibrid of poly(meta-phenylene isophthalamide) was produced by using an apparatus (wet-deposition apparatus) for producing pulp particles constituted of a combination of a stator and a rotor described in Japanese Patent Application Publication No. Sho 52-15621. This fibrid was treated by using a disintegrator and a beater/refiner to adjust the length-weighted mean fiber length to 0.9 mm. The freeness of the obtained aramid fibrid was 90 cm$^3$.

Meanwhile, a meta-aramid fiber (NOMEX (registered trademark), single yarn fineness: 2 denier) manufactured by DuPont was cut into pieces having a length of 6 mm (hereinafter referred to as "aramid short fiber").

(Production of Aramid Paper)

The prepared aramid fibrid and aramid short fiber were each dispersed in water to prepare slurries. These slurries were mixed with each other with the mixing ratio (weight ratio) of the fibrid and the aramid short fiber being 1/1, and a sheet-like article was fabricated by using a TAPPI-type manual paper machine (cross-sectional area: 625 cm$^2$). Subsequently, this sheet-like article was hot pressed with metal calender rolls at a temperature of 330° C. and a linear pressure of 300 kg/cm. In such a manner, aramid papers shown in Tables 1 and 2 were obtained.

(Production of Insulating Papers)

By using the aramid paper and a semi-aromatic polyamide resin composition containing 50% by weight of an epoxy group-containing phenoxy resin (Formulation Example 6 in Japanese Patent Application Publication No. 2006-321183), aramid paper-containing insulating papers shown in Examples 1 and 2 in Table 1 and Comparative Examples 1 and 2 in Table 2 each having a three-layer structure of aramid paper/resin composition/aramid paper (with a weight ratio of 37/54/37) in which the aramid papers were arranged on outer sides were obtained by the method described in Paragraph [0024] of Japanese Patent Application Publication No. 2006-321183.

Examples 1 and 2

(Production of Insulating Papers Subjected to Plasma Surface Treatment)

The insulating papers shown in Table 1 were passed through an inner electrode type low-temperature plasma treatment apparatus described in FIG. 1 of Japanese Patent No. 4607826 to perform a low-temperature plasma treatment on randomly selected one of the surfaces of each insulating paper with a treatment intensity of 650 W·min/m$^2$. Here, the composition ratio X (O/C) of the numbers of oxygen atoms (O) and carbon atoms (C) on the surface of the insulating paper was 206% of the theoretical value of the ratio of the numbers of atoms.

(Production of Motor Bobbins)

Motor bobbins were obtained by conducting insertion molding using each of the insulating papers subjected to the plasma surface treatment and polyphenylene sulfide (FORTRON (registered trademark) 1140 A64)) manufactured by POLYPLASTICS CO., LTD. as a polymer under the conditions shown in Table 1. Table 1 shows the values of main characteristics of the thus obtained motor bobbins.

In each of the motor bobbins of Examples, the bobbin body is made of the insulating paper, and has a small thickness. Hence, an increase in efficiency can be expected by achieving a high coil space factor. In addition, the insulating paper and the molded resin article are sufficiently connected and fixed to each other. Moreover, since no warp occurs in the insulating paper, the insulating paper is in close contact with the core member. Accordingly, the breakdown voltage can be expected to be sufficiently high. Furthermore, since the heat resistance of each of the aramid paper and the polymer used is high, the motor bobbin presumably can sufficiently withstand the heat generated by the coil. Therefore, the motor bobbins are useful as motor bobbins capable of coping with an increased efficiency and an increased power output of a motor generator or the like.

TABLE 1

| Characteristics | Unit | Ex. 1 | Ex. 2 |
|---|---|---|---|
| Insulating paper | wt % | 3 | 3 |
| Basis weight | g/m$^2$ | 128 | 128 |
| Thickness | μm | 140 | 140 |
| Density | g/cm$^3$ | 0.91 | 0.91 |
| Polymer | | | |
| Polyphenylene sulfide | wt % | 97 | 97 |

TABLE 1-continued

| Characteristics | Unit | Ex. 1 | Ex. 2 |
|---|---|---|---|
| Molding | | | |
| Polymer temp. | ° C. | 322 | 322 |
| Mold temp. | ° C. | 81 | 152 |
| Bonding quality | | good | good |
| Appearance of insulating paper portion | | good | good |

Comparative Examples 1 to 6

(Production of Insulating Papers)

Sheets of each of the aramid paper and a sheet of a polyethylene terephthalate film (S28 #16, thickness: 16 μm) manufactured by Toray Industries, Inc. were laminated on each other with an adhesive agent. In such a manner, aramid paper-containing insulating papers shown in Comparative Examples 3 to 6 in Table 2 each having a three layer structure of aramid paper/polyethylene terephthalate film/aramid paper (with a weight ratio of 37/24/37) in which the sheets of the aramid paper were arranged on outer sides were obtained.

(Production of Insulating Papers Subjected to Plasma Surface Treatment)

Each of the insulating papers shown in Comparative Examples 5 and 6 in Table 2 was passed through an inner electrode type low-temperature plasma treatment apparatus described in FIG. 1 of Japanese Patent No. 4607826 to conduct a low-temperature plasma treatment on randomly selected one of the surfaces of each insulating paper with a treatment intensity of 650 W·min/m$^2$. Here, the composition ratio X (O/C) of the numbers of oxygen atoms (O) and carbon atoms (C) of the surface of the insulating paper was 206% of the theoretical value of the ratio of the numbers of atoms.

(Production of Motor Bobbins)

Motor bobbins were obtained by conducing insertion molding using each of the insulating papers and polyphenylene sulfide (FORTRON (registered trademark) 1140 A64)) manufactured by POLYPLASTICS CO., LTD. as a polymer under the conditions shown in Table 2. Table 2 shows the values of main characteristics of the thus obtained motor bobbins.

In each of the motor bobbins of Comparative Examples 1 to 4, part of the insulating paper was not impregnated with the resin, and a space was found between the insulating paper and the molded resin article in some portion under visual observation. It is conceivable that this may cause partial discharge when the bobbin is used in a motor or the like, decrease in efficiency due to decrease in coil space factor because of the thickening of the space portion, a trouble during fitting in the core, and the like. Hence, it can be understood that the motor bobbins of Comparative Examples 1 to 4 are not suitable as motor bobbins capable of coping with an increased efficiency and an increased power output of a motor generator or the like. In addition, since the aramid paper and the film were laminated on each other in each of the motor bobbins of Comparative Examples 3 to 6, a warp occurred because of the shrinkage of the film portion. There is a possibility that the warp will deteriorate the close contact with the core member, and lower the breakdown voltage. Moreover, it is conceivable that a large warp may cause a trouble during fitting in a core or the like. Hence, it can be understood that the motor bobbins of Comparative Examples 3 to 6 are not suitable as motor bobbins capable of coping with an increased efficiency and an increased power output of a motor generator or the like.

Most films are stretched, in general, and undergo thermal relaxation and shrinkage. The thermal relaxation and shrinkage may cause deformation of the insulating paper, as described above, in a case where a molded resin article of a motor bobbin is connected and fixed to a bobbin body of an insulating paper simultaneously with the production of the molded resin article by a melt injection molding method.

TABLE 2

| Characteristics | Unit | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
| Insulating paper | wt % | 3 | 3 | 3 | 3 | 3 | 3 |
| Basis weight | g/m² | 128 | 128 | 128 | 128 | 128 | 128 |
| Thickness | μm | 140 | 140 | 140 | 140 | 140 | 140 |
| Density | g/cm³ | 0.91 | 0.91 | 0.91 | 0.91 | 0.91 | 0.91 |
| Polymer | | | | | | | |
| Polyphenylene sulfide | wt % | 97 | 97 | 97 | 97 | 97 | 97 |
| Molding | | | | | | | |
| Polymer temp. | ° C. | 323 | 323 | 323 | 323 | 322 | 322 |
| Mold temp. | ° C. | 81 | 156 | 81 | 156 | 81 | 152 |
| Bonding quality | | poor | poor | poor | poor | good | good |
| Appearance of insulating paper portion | | good | good | warp | warp | warp | warp |

REFERENCE SIGNS LIST

1: motor bobbin
2: bobbin body
4: molded resin article
6: center portion
8: bent portion
10: main body portion
12: eave portion
12a: extending portion
14: groove
16: protrusion
18: recessed portion

The invention claimed is:

1. A motor bobbin around which a coil is to be wound, the motor bobbin comprising:
   an insulating paper; and
   a molded resin article, wherein
   the insulating paper defines a body of the motor bobbin, a portion of the insulating paper being suspended with support by the molded resin article only at opposite ends of the insulating paper such that the suspended portion of the insulating paper is not in contact with the molded resin article,
   the insulating paper and the molded resin article are connected and fixed to each other without using an adhesive agent,
   a surface of the insulating paper in contact with the molded resin article comprises an aramid paper comprising an aramid fibrid and an aramid short fiber,
   the insulating paper being formed of a melt-extruded and thermally melt-bonded resin onto the aramid paper comprising the aramid fibrid and the aramid short fiber,
   the surface of the insulating paper comprising the aramid paper having a surface treatment, the surface treatment being at least one of a plasma surface treatment, a corona surface treatment, and a liquid immersion surface treatment, and
   the motor bobbin being formed of a molten portion of the molded resin article brought into contact with the aramid paper.

2. The motor bobbin according to claim 1, further comprising:
   another molded resin article, the molded resin article and the another molded resin article being respectively connected to respective ends of the bobbin body.

3. The motor bobbin according to claim 1, wherein
   the surface of the insulating paper in contact with the molded resin article is impregnated with the molded resin article.

4. The motor bobbin according to claim 2, wherein
   the molded resin article and the another molded resin article both have grooves for positioning a coil.

5. A method for producing a motor bobbin around which a coil is to be wound, the method comprising:
   subjecting a surface of an insulating paper to a surface treatment, the surface treatment being at least one of a corona surface treatment and a liquid surface treatment;
   simultaneously bonding a molded resin article and the insulating paper defining a body of the motor bobbin, to each other with molding of the molded resin article such that a suspended portion of the insulating paper is suspended with support by the molded resin article only at opposite ends of the insulating paper such that the suspended portion of the insulating paper is not in contact with the molded resin article, the insulating paper and the molded resin article being connected and fixed to each other without using an adhesive agent, a surface of the insulating paper comprising an aramid paper comprising an aramid fibrid and an aramid short fiber; and
   melt-extruding and thermally melt-bonding a resin onto the insulating paper,
   wherein the molded resin article is bonded to the insulating paper by bringing a molten portion of the molded resin article into contact with the aramid paper.

6. A motor comprising a stator having a core member integrated with the motor bobbin according to claim 1, wherein the stator winding is wound around the motor bobbin according to claim 1.

7. A motor generator comprising a stator having a core member integrated with the motor bobbin according to claim 1, wherein the stator winding is wound around the motor bobbin according to claim 1.

8. A power generator comprising a stator having a core member integrated with the motor bobbin according to claim 1, wherein the stator winding is wound around the motor bobbin according to claim 1.

* * * * *